3,088,975
PREPARATION OF CARBONYL FLUORIDE
Frank S. Fawcett and Charles W. Tullock, Wilmington, Del., assignors to E. I. du Pont de Nemours and Company, Wilmington, Del., a corporation of Delaware
No Drawing. Filed Apr. 9, 1959, Ser. No. 805,133
6 Claims. (Cl. 260—544)

This invention relates to a new method of preparing carbonyl fluoride.

Carbonyl fluoride, $COF_2$, is one of the most useful and convenient starting materials in the synthesis of tetrafluoroethylene by the high temperature reaction of carbon with reactive fluorides. The preparation of tetrafluoroethylene from carbonyl fluoride and carbon is described and claimed in U.S. Patent 2,709,189.

The only economical method of preparing carbonyl fluoride known heretofore is that described by Kwasnik [FIAT Review of German Science 1936–46, Inorganic Chemistry, I, p. 242 (1948)], whereby phosgene and hydrogen fluoride are reacted at moderate temperatures in the presence of active carbon as catalyst. However, even this method has disadvantages since the carbonyl fluoride cannot be separated by simple distillation from the hydrogen chloride formed at the same time, the two compounds having nearly the same boiling points. To separate the carbonyl fluoride from the hydrogen chloride, it is necessary to employ the special purification method described and claimed in U.S. Patent 2,836,622.

The principal object of the present invention, therefore, is the provision of a new method for preparing carbonyl fluoride from economical materials directly and without concomitant formation of hydrogen chloride.

In accordance with the above-mentioned and other objects, carbonyl fluoride is now prepared by a process which comprises maintaining phosgene and sodium fluoride in contact at a temperature in the range of 0 to 150° C. and under substantially anhydrous conditions in a liquid organic medium substantially non-reactive towards carbonyl halides and having a dielectric constant at 20° C. of at least 20, until carbonyl fluoride is formed.

The reaction may be represented by the equation $COCl_2 + 2NaF \rightarrow 2NaCl + COF_2$. No reaction product is formed whose boiling point is close to that of carbonyl fluoride. The latter, a gas boiling at −83° C., is readily separated in a good state of purity from any unreacted phosgene and/or from the liquid reaction medium. Carbonyl chlorofluoride, which is occasionally present in small amounts, is also separated without difficulty by simple fractionation.

The sodium fluoride can be used as the commercial product without special purification, provided it is substantially anhydrous and substantially free of any hydrogen fluoride that may be present as the bifluoride salt. It is preferably used in a finely divided form. The organic reactant, phosgene, can also be used as the commercial grade without purification. The relative proportions of the two reactants are not critical. They are important only to the extent that it is generally desired to utilize as much of the phosgene as possible, to facilitate separation of the carbonyl fluoride. For this reason, there is desirably used at least two moles of sodium fluoride per mole of phosgene, although this is by no means essential. A slight to moderate excess of sodium fluoride, e.g., from 2.1 to 4 moles per mole of phosgene, is normally used.

An essential feature of this process is the use of an organic reaction medium, liquid at reaction temperature and having a high dielectric constant, at least 20 when measured at or above 20° C. The function of these high dielectric constant media is not clearly understood. The suitability of a liquid medium of this type is not connected with its ability to dissolve the sodium fluoride, since many such media have little or no solvent action on this salt. However, the reaction medium should be one in which phosgene is at least partly soluble, for example to the extent of 10% by weight. Preferably, the reaction medium is miscible with phosgene.

It is, of course, necessary that the reaction medium be one that is not readily reactive with phosgene or carbonyl fluoride under the operating conditions, since otherwise the conversions would be adversely affected. Complete inertness towards carbonyl halides is not essential, however, since a low order of reactivity does not seriously interfere with the desired reaction, particularly if the carbonyl fluoride is removed from the reaction mixture as it forms. Suitable reaction media (provided they have the necessary high dielectric constant) are those which are free of active hydrogen, i.e., of hydrogen attached to an element other than carbon. There are also a few organic liquids of high dielectric constant which, even though they are not normally viewed as containing active hydrogen, are nevertheless unsuitable because they are too readily reactive towards phosgene, either because they are capable of forming active hydrogen-containing tautomers or for some other reason. Such, for example, are hydrogen cyanide, ketones, alkyl sulfoxides and nitrogen-substituted amides. There is a very simple test whereby undesirably reactive reaction media can be recognized. This consists in maintaining phosgene in contact for a few moments at room temperature or at slightly elevated temperature, e.g., up to 75° C. with an excess of the liquid being tested. Under these conditions, one or more of the following phenomena will take place if the medium is reactive: substantial heat evolution, coloration, evolution of hydrogen chloride or formation of a precipitate. If none of these occur, the medium can be considered as suitable.

The amount of reaction medium present in the reaction mixture is not critical. It need only be sufficient to keep the mixture fluid at the reaction temperature and to insure contact between the reactants. In practice, there is desirably used a weight of reaction medium at least equal to the weight of sodium fluoride. A large excess of reaction medium can be employed since it is not consumed and can be recovered by filtering off the sodium halides and reused. The reaction medium should be as dry as possible to avoid excessive hydrolysis of the phosgene and carbonyl fluoride.

Suitable reaction media, all having a dielectric constant of at least 20 at 20° C., include acetonitrile, propionitrile, butyronitrile, crotononitrile, adiponitrile, benzonitrile, nitromethane, nitroethane, 1-nitropropane, 2-nitropropane, nitrobenzene, o-nitrotoluene, m-nitrotoluene, 1-chloro-2-nitrobenzene, methyl o-nitrobenzoate, dimethyl sulfate, diethyl sulfate, cyclic tetramethylene sulfone, ethylene carbonate, trimethylene carbonate, methylethylene carbonate, chloroethylene carbonate, 1,2-dichloroethylene carbonate, etc. The preferred reaction media, because of their inertness towards phosgene under the operating conditions, are the nitriles, nitro compounds, sulfones, carbonates and sulfates which except for the functional groups, are hydrocarbon or chlorohydrocarbon. Otherwise stated, the preferred reaction media are those compounds, having dielectric constant of at least 20 at 20° C. and free of active hydrogen, which contain only carbon and hydrogen, and optionally chlorine attached only to carbon, and one of the groups —CN, —$NO_2$, —$SO_2$—, —O—CO—O— and —O—$SO_2$—O—.

The process can be carried out at temperatures as low as 0° C. In the most active reaction media, such as acetonitrile, the reaction is slightly exothermic. It is not necessary to exceed a temperature of 150° C., and it is even undesirable to do so since excessive side reactions between the phosgene and the reaction medium begin to take place at that temperature. In fact, it is much preferred to operate below 100° C., the best temperature range being that between 15 and 75° C. The reaction can be, and most conveniently is, carried out at or near atmospheric pressure, at a temperature not exceeding the boiling point of the reaction medium, the carbonyl fluoride being permitted to escape from the reaction mixture as it forms and being led to cold receivers where it is condensed. When operating under such conditions, it is advantageous to use a reflux condenser cooled to a temperature between about −50 and −75° C., which lets the carbonyl fluoride escape but returns the phosgene and any carbonyl chlorofluoride which may have formed to the reaction mixture for further reaction with the sodium fluoride. In the event the reaction medium freezes at relatively high temperature, a two-stage reflux condensing system may be used, with the first stage held at a temperature below the boiling point but above the melting point of the medium and the second stage held at about −80° C. The process can also be conducted in sealed vessels under the autogenous pressure developed at the operating temperature by the ingredients present, after which the volatile reaction product is removed by evaporation. Reaction times varying from a few minutes to two hours or longer can be used.

The volatile reaction product may contain, besides carbonyl fluoride, some unreacted phosgene and small amounts of carbonyl chlorofluoride, COFCl. Some carbon dioxide may be present, owing to hydrolysis caused by adventitious moisture. As already noted, the carbonyl fluoride can be isolated in a good state of purity by fractionation. Normally, the product as obtained directly contains 90–95% or more of carbonyl fluoride and needs no further purification.

The invention is illustrated in greater detail in the following examples.

*Example I*

A. A 1-liter bomb, made of the nickel-iron-molybdenum alloy known as "Hastelloy" C, was freed of air and charged with 98 g. of acetonitrile, 65 g. of finely divided sodium fluoride and 50 g. of phosgene. The bomb was heated with rocking at 50° C. for one hour, then at 150° C. for one hour. After cooling to room temperature, the gaseous reaction product (29 g.) was evaporated into a stainless steel cylinder cooled in liquid nitrogen. Infrared analysis showed that this product contained, on a molar basis, 75% of carbonyl fluoride, a trace of phosgene, a trace of carbonyl chlorofluoride, and less than 5% each of carbon dioxide, silicon tetrafluoride and carbon oxysulfide, the latter presumably being present in the phosgene as an impurity. The remainder was air, introduced during the analytical sampling and manipulations. This result indicated that about 65% of the phosgene had been converted to carbonyl fluoride. However, no attempt was made to recover any additional carbonyl fluoride dissolved in the reaction medium.

B. In contrast to the above, when a mixture of 100 g. of sodium fluoride and 27 g. of phosgene, without reaction medium, was allowed to stand at 25° C. for 48 hours in a bomb under autogenous pressure, the volatile reaction product (27 g.) was found by infrared analysis to consist essentially of unreacted phosgene with about 5% of carbonyl chlorofluoride and no carbonyl fluoride.

Even at temperatures considerably exceeding room temperature, the reaction does not yield carbonyl fluoride in the absence of a reaction medium of the type defined above. Thus, when finely divided sodium fluoride (60 g.) and phosgene (33 g.) without reaction medium were heated in an agitated bomb at 100° C. for 2 hours, the gaseous product (32 g.) was found to contain, on a molar basis, 75% of unreacted phosgene and 25% of carbonyl chlorofluoride, with at best a trace of carbonyl fluoride.

*Example II*

A dry 12-liter glass reactor was charged with 3500 g. of finely divided sodium fluoride and 6000 cc. of acetonitrile. This mixture was stirred and warmed to 35° C. by means of a water bath. The bath was then removed and a mixture, precooled to below 0° C., of 3545 g. of phosgene and 2100 cc. of acetonitrile was introduced gradually into the reactor over a period of 5 hours, at such a rate that the heat of the reaction maintained the reaction mixture at 35±2° C. During this time, the evolved gases were passed first through a reflux condenser cooled at 0–5° C. by circulating ice water, then through a second reflux condenser cooled at about −70° C. by circulating acetone cooled in a carbon dioxide-acetone bath, and finally through traps immersed in a carbon dioxide-acetone slurry. The gas passing through this system was then condensed as a liquid in a receiver cooled at −100° C. by means of a coolant (isohexane or dichlorodifluoromethane) refrigerated by passage of liquid nitrogen through a coil. The liquid product so obtained was transferred to stainless steel cylinders. It amounted to 1867 g., and infrared analysis showed that it consisted of carbonyl fluoride of approximately 95% purity. The yield based on the phosgene was nearly 80%.

When the above process was carried out under similar conditions but the reaction temperature during addition of the phosgene was maintained at 2–9° C. by external cooling, after which the mixture was allowed to warm up to 22° C., similar results were obtained. The carbonyl fluoride contained no carbonyl chlorofluoride and only traces of unreacted phosgene.

In contrast with the above, when a mixture of 100 g. of finely divided sodium fluoride, 84 g. of phosgene and 350 ml. of dry benzene (a medium which is a good solvent for phosgene but has a low dielectric constant) was stirred under a solid carbon dioxide-cooled condenser at 25–35° C. for 1.5 hours, then at 35–47° C. for 3.5 hours, no carbonyl fluoride was obtained.

*Example III*

A 500-ml. bomb was charged with 60 g. of sodium fluoride, 50 g. of phosgene and 250 g. of cyclic tetramethylene sulfone (tetrahydrothiophene-1,1-dioxide), and agitated at 25° C. for 3 hours. The volatile products (48 g.) was shown by infrared analysis to contain, on a molar basis, 30% of carbonyl fluoride, 30% of carbonyl chlorofluoride and 30% of unreacted phosgene, with less than 5% each of carbon dioxide and carbon oxysulfide.

Much better conversions to carbonyl fluoride essentially free of carbonyl chlorofluoride are obtained in the same reaction medium by using the procedure described in Example II at a somewhat higher temperature, of the order of 40–75° C.

*Example IV*

A glass flask was fitted with a thermometer, stirrer, inlet tube with dropping funnel and a reflux condenser arranged for cooling by means of solid carbon dioxide and acetone. The top of the condenser was connected to glass traps cooled in liquid nitrogen. A mixture of 60 g. of finely divided sodium fluoride and 142 g. of nitromethane was placed in the flask. A solution of 46 g. of phosgene in 171 g. of nitromethane was added through the dropping funnel over a period of 6 minutes, while the contents of the flask were stirred. During this period, the temperature of the mixture remained at 25° C. Stirring was continued for 1.25 hours, during which the temperature of the mixture rose slightly. The mixture was then warmed to 32° C. over a period of 12 minutes. The product which had collected in the cold traps was found to contain, on a molar basis, 87% of carbonyl fluoride and about 1% each of carbonyl chlorofluoride and phosgene, with small amounts of carbon dioxide.

Example V

Using the apparatus and procedure of Example IV, a solution of 60 g. of phosgene in 135 g. of dimethyl sulfate was added over a period of 9 minutes to a stirred suspension of 60 g. of sodium fluoride in 165 g. of dimethyl sulfate at 23-24° C. The mixture was then warmed to 30-38° C. and stirred for 1.75 hours. The product collected in the cold traps was found to contain, on a molar basis, 80% of carbonyl fluoride, 1% of carbonyl chlorofluoride, less than 5% of phosgene and about 15% of carbon dioxide.

Example VI

In the apparatus of Example IV was placed a mixture of 80 g. of sodium fluoride and 250 g. of cyclic ethylene carbonate, the mixture being held at 40° C. to keep the ethylene carbonate in molten condition. Phosgene (52 g.) was distilled into the flask containing the stirred suspension over a period of 25 minutes, during which time the internal temperature rose to 42° C. The mixture was then held at 41-42° C. while stirring was continued for an additional 20 minutes. The product collected in the cold traps (25 g.) was found to contain, on a molar basis, 85% of carbonyl fluoride, less than 1% of carbonyl chlorofluoride, less than 5% of phosgene and 10% of carbon dioxide.

The foregoing examples are merely illustrative, and modifications may be made to the described procedures without departing from the scope of the invention. For example, the process can be carried out by continuous slurry operation, wherein make-up sodium fluoride is added to the reactor, part or most of the slurry is withdrawn, the solid sodium halides are filtered off and the liquid reaction medium is returned to the reactor. Another mode of procedure consists in operating under reflux but at a predetermined superatmospheric pressure, so as to permit the use of higher reflux temperatures and more economical cooling means.

Since additional obvious modifications in the invention will be evident to those skilled in the chemical arts, we propose to be bound solely by the appended claims.

The embodiments of the invention in which an exclusive property or privilege is claimed are defined as follows:

1. The process of preparing carbonyl fluoride which comprises reacting carbonyl chloride with sodium fluoride at a temperature between 0 and 150° C. under substantially anhydrous conditions in a liquid reaction medium of the group consisting of acetonitrile, propionitrile, butyronitrile, crotononitrile, adiponitrile, benzonitrile, nitromethane, nitroethane, 1-nitropropane, 2-nitropropane, nitrobenzene, o-nitrotoluene, m-nitrotoluene, 1-chloro-2-nitrobenzene, methyl o-nitrobenzoate, dimethyl sulfate, diethyl sulfate, cyclic tetramethylene sulfone, ethylene carbonate, trimethylene carbonate, methylethylene carbonate, chloroethylene carbonate and 1,2-dichloroethylene carbonate.

2. The process of preparing carbonyl fluoride which comprises reacting carbonyl chloride with sodium fluoride at a temperature between 15 and 75° C. under substantially anhydrous conditions in acetonitrile.

3. The process of preparing carbonyl fluoride which comprises reacting carbonyl chloride with sodium fluoride at a temperature between 15 and 75° C. under substantially anhydrous conditions in cyclic tetramethylene sulfone.

4. The process of preparing carbonyl fluoride which comprises reacting carbonyl chloride with sodium fluoride at a temperature between 15 and 75° C. under substantially anhydrous conditions in nitromethane.

5. The process of preparing carbonyl fluoride which comprises reacting carbonyl chloride with sodium fluoride at a temperature between 15 and 75° C. under substantially anhydrous conditions in dimethyl sulfate.

6. The process of preparing carbonyl fluoride which comprises reacting carbonyl chloride with sodium fluoride at a temperature between 15 and 75° C. under substantially anhydrous conditions in cyclic ethylene carbonate.

References Cited in the file of this patent

UNITED STATES PATENTS

| 2,690,430 | Anderson | Sept. 28, 1954 |
| 2,836,622 | Tullock | May 27, 1958 |
| 2,928,720 | Tullock | Mar. 15, 1960 |

OTHER REFERENCES

Humiston: J. Physical. Chem., vol. 23, pp. 575-576.

Saunders et al.: J. Chem. Soc. (London), vol. of 1948, pp. 1773-1779.

Groggins: "Unit Processes in Organic Synthesis," 5th ed., page 210 (1958).

Nesmejanov et al.: Ber. Deut. Chem., vol. 67, pages 370-373 (1934).

Fieser et al.: "Organic Chemistry," 2nd ed., page 189 (1950).

Conant et al.: "The Chemistry of Organic Compounds," 4th ed., pages 319-320 (1952).

(All copies cited above found in Scientific Library.)